United States Patent Office 2,785,359
Patented Mar. 12, 1957

2,785,359

VARIABLE VOLTAGE MOTOR CONTROL

George E. King, Eggertsville, N. Y., and Arthur O. Fitzner, Fond du Lac, Wis., assignors to Westinghouse Electric Corporation, East Pittsburgh, Pa., a corporation of Pennsylvania Application March 17, 1955, Serial No. 494,993

13 Claims. (Cl. 318—143)

Our invention relates to motor control systems, and more particularly to motor control systems for reciprocating machine tools wherein the speed and direction of rotation of a reversing drive motor is varied in accordance with a variable voltage control.

Reciprocating machine tools of the type adapted for use with our invention, such as planers, transfer tables, and draw-cut shapers, are constantly being improved, and with this improvement they are capable of operating at ever-increasing speeds. As the speed of operation is increased by such expedients as reducing the ratio of the drive gears and increasing drive motor R. P. M., the stored energy of the machine table and of the motor armature is accordingly increased. The time required to brake the motor to zero speed must be substantially decreased if the amount of table overtravel after a reversing operation has been initiated by tripping limit switches in the electrical control system is to remain within tolerable limits.

Along with the problem of bringing the drive motor and machine tool table to rest in a minimum amount of time, there exists the conflicting requirement of prevention of flashing at the drive motor and main generator commutators. Provision of a control system having very high gain so as to quickly reverse the polarity of the exciter voltage applied to the main generator field can easily induce excessively high armature current in the drive motor and main generator loop due to the rapid rate of change of flux in the magnetic circuit of the generator. This condition leads to flashover at the commutators that can destroy the commutator segments.

One object of our invention is to provide a control system for a reciprocating machine tool wherein overtravel of the machine tool after a reversing cycle has been initiated is reduced to a minimum.

Another object of our invention is to provide a variable voltage control system for a reciprocating machine tool that will limit the armature current of the drive motor and its associated generator to a value that will be insufficient to cause flashover at the commutators thereof.

Another object of our invention is to provide a variable voltage control system for a reciprocating machine tool, that can be controlled from small conveniently-mounted speed rheostats, push-buttons and like control devices.

Another object is to provide a variable voltage control system for a reversing drive motor controlling the movement of a high inertia reciprocating mechanism that will bring the motor and the mechanism to rest with a minimum time delay.

Still another object is to provide a control system for a generator energizing a direct current drive motor for a high inertia mechanism that will prevent flashover at the commutators of the motor and generator when the motor and the driven mechanisms are suddenly brought to rest.

Still another object is to provide a control mechanism for a reversing drive motor that will reverse the direction of rotation of the motor in a minimum of time while providing against flashover in the motor and generator armature circuits.

Other objects and features of the invention will become apparent upon consideration of the following detailed description when taken in connection with the accompanying drawings, which illustrate in schematic form one embodiment of the invention.

Variable voltage control systems of the type herein described utilize a direct current generator and a direct current motor having armatures serially connected in a closed loop. In the past, the polarity and magnitude of the generator voltage, and thus the direction and speed of motor rotation, have been controlled by excitergenerators of special design. A system utilizing such an exciter-generator is shown in George E. King Patent No. 2,205,204.

According to one aspect of our invention, an excitergenerator which is of conventional design and is not at all critical as to the operating conditions imposed thereon, supplies excitation to the variable-voltage main generator. To accomplish this we use a pair of self-saturating magnetic amplifiers to provide field excitation for this excitergenerator so as to control the magnitude and polarity of the output voltage thereof in accordance with the magnitude and direction of current flow through a control winding on the magnetic amplifier. One of the field windings on the exciter-generator is connected to a separate control winding means on the magnetic amplifier so as to impose a voltage thereacross indicative of the rate of change of the output voltage of the exciter-generator, in such a manner as to oppose the effect of the change in current through the main control winding. Any significant changes in the exciter output voltage will thereby be dampened and deleterious results on the overall system arising therefrom will be obviated.

According to another aspect of our invention, voltages are derived from the armature circuits of the excitergenerator and of the main generator indicative of the magnitude and polarity of the instantaneous voltages existing thereacross. These voltages are applied to opposite terminals of magnetic amplifier feedback windings, preferably through a biased rectifier bridge having the electrical equivalent of a lost-motion mechanical coupling. Under substantially steady-state conditions, the voltages are adjusted so as to oppose each other and thus not effect the operation of the circuit. Upon reversal, the exciter voltage rapidly changes when the exciter output voltage changes polarity and causes a high voltage to appear across the aforesaid feedback winding and biased rectifier bridge, so that current flows therethrough. This current opposes the main control winding current and thereby effectively limits the exciter voltage excursion. As the main generator voltage decreases and swings through zero, the current through the feedback winding will stop unless the exciter voltage simultaneously increases. The limit on exciter voltage excursion is thereby automatically raised as the main generator reverses its voltage. The biased rectifier bridge holds off limiting action as described above until the exciter voltage has reached magnitudes such that should be limited in order to protect the main generator and drive motor from flashing.

Figure 1:
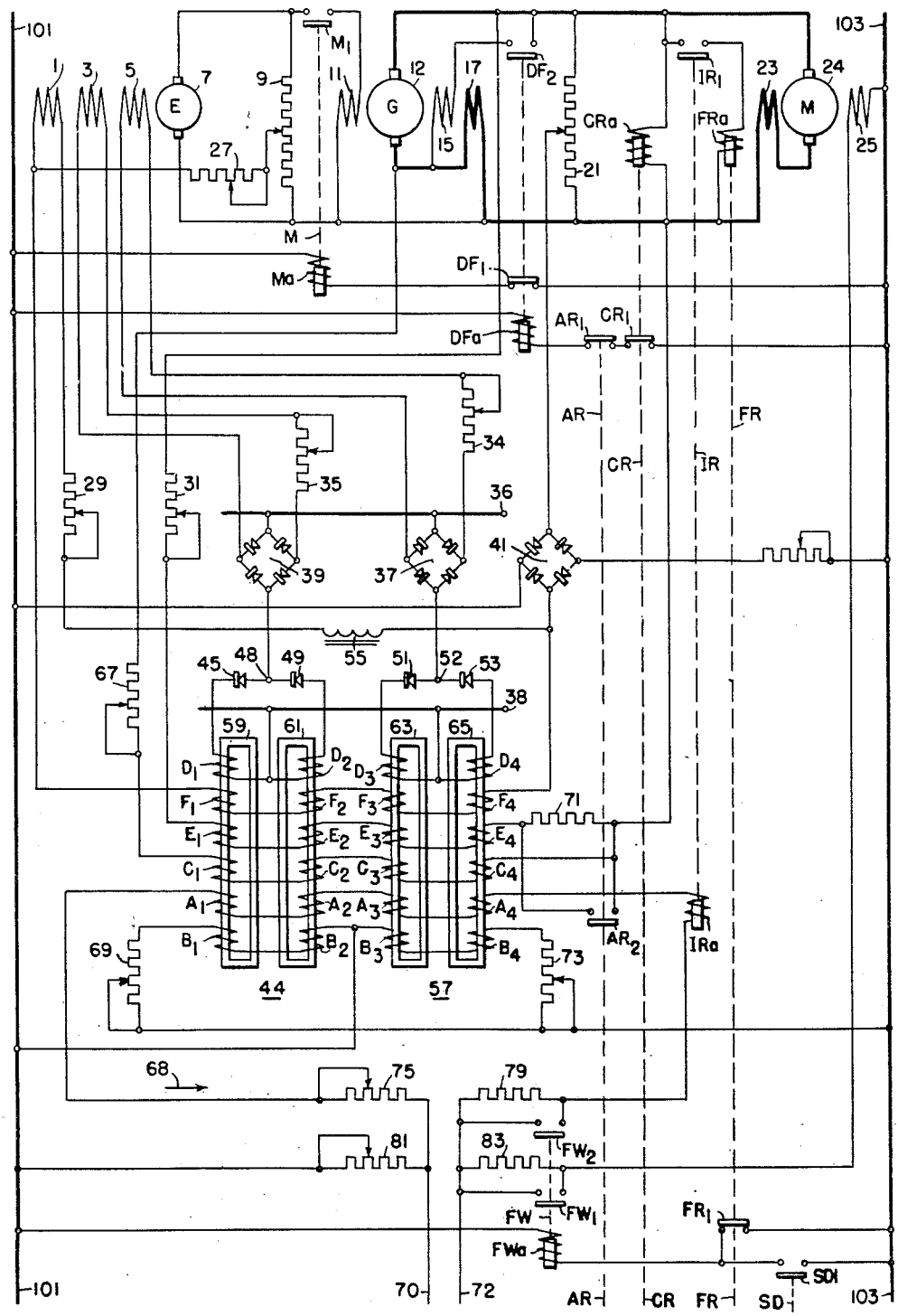
Figure 1 is a diagrammatic illustration of a motor control arrangement embodying the principles of this invention.
Figure 2:
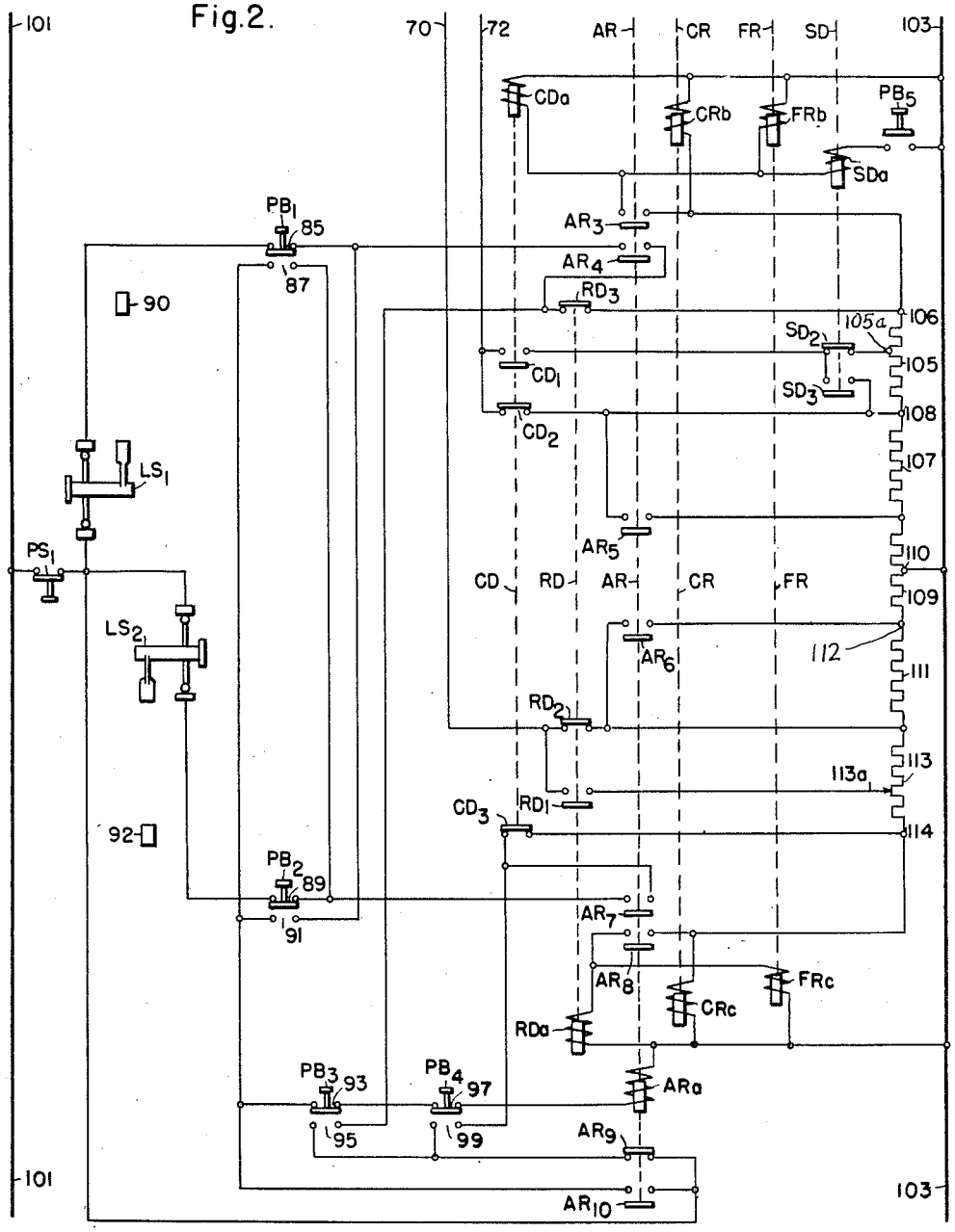
Fig. 2 is a completion of the circuit of Fig. 1.

More specifically and with reference to the drawings, consisting of Fig. 1 and Fig. 2, there is shown a detailed schematic diagram of our invention. Therein is shown a main drive motor M which is mechanically connected through appropriate gearing to the table of a reciprocating machine tool, such as the platen of a planer (not shown). This motor has a separately excited field winding 25, and a commutator field winding 23 serially connected with the armature of the motor. The motor armature 24 and field winding 23 are connected in a loop circuit with the armature 12 and commutator winding 17 of main direct-current generator G.

Main generator G has a separately excited main field 11 and a shunt-connected differential, or "suicide" field 15. The differential field 15, in the absence of excitation supplied by the separate field winding 11, prevents a "creeping" speed of the motor M. This differential field 15 is adapted to be cut out of the circuit (under appropriate operating conditions) by the control mechanism described below.

Excitation is supplied for main generator field winding 11 by means of exciter-generator E which functions as a rotating magnetic amplifier. In the preferred embodiment herein described, this exciter-generator has three control or field windings 1, 3 and 5; field windings 3 and 5 are adapted to provide a reversible field flux that will control the magnitude and polarity of the exciter output voltage. Field winding 1, hereinafter called the feedback winding, is disposed in inductive relationship to the other fields and is adapted to generate a voltage across its terminals proportional to the rate of change of the output voltage of the exciter, as taught in J. T. Carlton Patent No. 2,677,097. Excitation current for field windings 3 and 5 is provided by a two-channel magnetic amplifier system, the output of one channel 57 being coupled to winding 5 and the output of the other channel 44 being coupled to winding 3.

The magnetic amplifiers are of conventional design, being of the self-saturating type such as described in W. T. Hunt, Jr. Patent No. 2,693,563. Magnetic amplifier channel 44 comprises two magnetic cores 59 and 61 on which are wound pattern or main control windings A1 and A2, bias windings B1 and B2, load windings D1 and D2, feedback-damper windings F1 and F2, generator voltage feedback windings E1 and E2, and load compensating windings C1 and C2. To insure current flow in only one direction through load windings D1 and D2, rectifiers 45 and 49 are connected in series circuit relationship with load windings D1 and D2, respectively. For the purpose of obtaining a direct current output, the input terminals of a bridge rectifier 39 is inserted in series with the parallel-connected windings D1 and D2 between input terminals 36 and 38 from a source of single phase power (not shown), the junction of D1 and D2 being connected to terminal 38, and the bridge rectifier input terminals connecting the juncture 52 of rectifiers 45 and 49 to terminal 48.

The field winding 3 of exciter-generator G is connected in series with resistance 35 to the output terminals of bridge rectifier 39. The function of resistance 35 is to adjust the field current that may flow under given operating conditions. Similarly, magnetic amplifier channel 57 comprises a pair of magnetic cores 63 and 65 on which are wound main power windings D3 and D4, damper windings F3 and F4, voltage feedback windings E3 and E4, load compensating windings C3 and C4, main control windings A3 and A4, and bias windings B3 and B4. The main power windings D3 and D4 are connected in parallel across single phase terminals 36 and 38 by means of rectifiers 51 and 53, respectively, in series with bridge rectifier 37. The output terminals of bridge rectifier 37 are coupled to field winding 5 by means of resistance 34.

The damper windings F1, F2, F3 and F4 are connected in a series loop with feedback winding 1 through adjustable resistance 29 and inductor 55. The connection is such that the flux produced thereby in the various magnetic cores oppose the fluxes set up by the main control windings A1, A2, A3 and A4 on the respective cores. The function of inductor 55 and resistance 29 is to improve the response of the system in the manner taught by J. T. Carlton Patent No. 2,677,097.

The voltage feedback windings E1, E2, E3 and E4 are serially connected; the serially connected windings are connected in parallel with armature 12 and commutator winding 17 of generator G. The windings and connections thereof are such that the flux produced in their respective magnetic cores by the output voltage of generator G oppose the flux produced by the main control or pattern windings thereof. To provide compensation in the excitation circuit for variations in the load on the motor, load compensating windings C1, C2, C3 and C4 are connected across the commutator winding 17 of generator G. Inasmuch as the current through the commutator field winding is functionally related to the load on the motor, the voltage drop thereacross can be used also as an indication of an instantaneous motor load. Commutator winding 17 is connected in parallel with serially connected load compensating windings C1, C2, C3 and C4, the windings and manner of connection being such that the flux produced thereby in the magnetic cores will aid the flux set up by the main control windings.

Bias windings B1 and B2 are serially connected as are bias windings B3 and B4; each pair of bias windings is connected across a constant voltage direct-current source (not shown) supplying energy to bus lines 101 and 103. The current flowing through the bias winding is adjusted by means of resistance elements 69 and 73 so that the magnetic amplifiers will operate close to cut-off with no current flowing through the damper windings, voltage compensation windings, and pattern windings.

To limit the forcing on the field 11 of generator G, there is provided a limiting network including potentiometer 21 connected across the armature 12 and commutator field 17 of generator G, potentiometer 9 connected across the output of exciter E, and biased bridge rectifier 41 connecting together the taps of potentiometers 9 and 21 through the damper windings F1, F2, F3 and F4 and resistor 27. The bridge rectifier has its output terminals in series with the damper windings between the potentiometer taps, and the input terminals thereof are connected between lines 103 and 101 to provide the bias across the output terminals. The taps are adjusted so that no current flows between potentiometer taps under steady-state operating conditions. When (under the influence of a sudden change in the voltage output of the magnetic amplifier), the voltage across exciter E changes more rapidly than generator G should be required to follow a current will flow through the damper windings of the magnetic amplifier that will decrease the voltage output thereof. In effect, the forcing on the field of the main generator is limited so that excessive current will not flow through the armature thereof.

The bias windings are so poled and excited that with no current flowing through the control, voltage feedback, load compensation, and damper windings, the amplifiers each have low output. When control current of a given direction of flow indicated by arrow 68 passes through the serially connected pattern windings, magnetic amplifier 44 will be quiescent but then amplifier channel 57 will excite field 5 so as to build up exciter E and generator G, and thereby drive motor M in the cut direction of rotation. The output voltage of generator G will build up until the ampere turns of the voltage feedback windings approach the ampere turns of the pattern windings. If the direction of control current flow is reversed, magnetic amplifier 57 will be quiescent and magnetic amplifier 44 will excite field 3 to build up the voltage outputs of exciter E and generator G in reverse polarity, and drive motor M in the return direction of rotation.

When a control current is applied to the pattern winding, the magnetic amplifier output current to the field windings of the exciter produced thereby is a function of the magnitude of the control current. As generator G builds up, the voltage feedback windings of the magnetic amplifiers are excited, and the exciting current to the exciter field windings is accordingly decreased. The generated voltages of exciter and generator will become steady when the ampere turns supplied by the pattern and voltage compensating windings approximately cancel; leaving only a small net ampere turn excitation sufficient to maintain the steady-state condition.

Likewise, when the load is suddenly increased, the load compensating windings will supply ampere turns that aid the flux produced by the pattern windings to increase the output voltages of exciter E and generator G and maintain a constant motor speed for a generator pattern current.

The energizing and control circuitry for the system hereinabove described will be best understood by going through the operating sequences thereof. Assume first that A.-C. bus lines 36, 38 and D.-C. bus lines 101, 103 are being supplied with normal voltage, that the motor driven generators E and G are up to normal speed, and that the drive motor M has previously been stopped with neither of limit switch LS1 or LS2 in the tripped condition. D.-C. bus lines 101, 103 will energize coil DFa to pickup relay DF and respectively open and close contacts DF1 and DF2; closure of contact DF2 will connect suicide or differential field 15 across armature 12 to prevent the generation of armature voltage by residual magnetism in generator G, and opening contacts DF1 disconnects exciter armature 7 from generator field 11 by dropping out relay M to further provide against accidental excitation of generator G. Maximum field excitation current flows through motor field 25 and through resistor 81, relay FW being picked up by the energization of coil FWa through relay contact FR1 to short-circuit resistor 83.

Momentary closure of push button PB2 will actuate relay AR by completing a circuit from bus 101 through pendant switch PS1, limit switch LS1, contacts 85 of push button PB1, contacts 91 of push button PB2, contacts 93 and 97 of push buttons PB3 and PB4 and automatic relay actuating coil ARa, to bus 103. Closure of contact AR10 of relay AR will provide a holding circuit for ARa which circuit is in parallel to LS1 and contacts 85 and 91. Push button PB2 may now be released. Relay FR and directional relay CD will pick up upon actuation of relay AR by virtue of the energization of coil CDa through the circuit including PS1, LS1, contact 85, contacts AR4, RD3, and AR3, and the coils of CD and FR connected in parallel, to bus 103. Differential field 15 of generator G, which was previously connected across the armature of the generator by contact DF2 of relay DF, will be disconnected upon the opening of contact AR1 and the resultant deenergization of coil DFa. This will enable the voltage of generator G to build up as hereinafter described. When relay DF drops out, contacts DF1 will be closed, thereby energizing the single coil Ma of relay M and connecting the exciter armature circuit to generator main field M through contact M1 of relay M.

When cut directional relay CD is actuated as mentioned above, contacts CD2 and CD3 will open and contact CD1 will close. The voltage between buses 101 and 103 was previously applied between terminal 106 of potentiometer 105 and center tap 110 of resistor 109 upon closure of contact AR4 of relay AR through normally closed contacts PS1, LS1, 85, and RD2. Upon closure of contact CD1 the voltage between tap 105a of potentiometer 105 and the juncture 112 of resistances 111 and 109 will be applied to the pattern winding circuit including resistor 75, the pattern windings A1, A2, A3 and A4, relay coil IRa and resistor 79. Current will flow through the pattern windings in the direction of arrow 68, magnetic amplifier channel 57 will supply current to the exciter field 5 and the exciter will build up to a voltage of a given polarity, magnetic amplifier 44 remaining quiescent. Excitation current thereby applied to field 11 will cause generator G to build up to a given polarity and the motor M will be accelerated in the cut direction. At the end of the cut stroke of the machine tool, dog 90 which is affixed to the machine tool platen in the usual manner will trip limit switch LS1 and bus 101 will be disconnected from terminal 106 of rheostat 105, which causes the pattern field current to decay rapidly. Relay CD will drop out and will apply the voltage across buses 101, 103 to the terminal 114 of rheostat 113 through contact CD3 and excite the pattern field winding with a small excitation current of the opposite direction of flow to that which was previously obtained through switch PS1, limit switch LS2 and contacts 89, AR7 and CD3. This exciting current will be of a very small value momentarily inasmuch as it is derived from the voltage across the lower half of resistor 109, but directional relay RD will pick up and apply the voltage between the potentiometer tap 113a and the center tap 110 of resistor 109 to the pattern field through contacts RD1, resistor 75, coil IRa or relay IR, resistor 79, contacts CD2, AR5, and the upper half of resistor 110. The output voltage of the magnetic amplifier, the exciter, and the main generator will quickly decay, reverse polarity and build up to a voltage of the opposite polarity determined by the current now flowing through the pattern fields of the magnetic amplifier. The drive motor will quickly stop and will accelerate in the return direction of rotation and drive the machine tool in its return stroke. Limit switch LS1 will be tripped back to its normal position at the beginning of the return stroke, and at the end of the return stroke limit switch LS2 will be tripped and opened. This will deenergize relay RDa opening contact RD1 and closing contacts RD2 and RD3. A minimum cut-direction excitation current will be immediately applied to the pattern field windings from the upper terminal 108 of resistor 107 through contacts AR5, CD2, resistor 79, relay coil IRa, resistor 75 and contacts RD2 and AR6, and the lower half of resistor 109. When cut directional relay CD picks up, it will apply the voltage between potentiometer tap 105a and the center tap 110 of resistor 109 to the pattern field windings through contacts SD2, CD1, resistor 79, coil IRa, resistor 75, contacts RD2 and AR6, and the lower half of resistor 109. The output from magnetic amplifier channel 44 will decrease and the output from channel 57 will build up, exciter 7 and generator 9 will reverse polarity and build up to the voltage determined by the current flowing through the control windings of the magnetic amplifier. Again, the drive motor will stop and will accelerate in the cut direction of rotation, thereby driving the planer platen through a cut stroke, closing limit switch LS2 at the beginning of the stroke and opening limit switch LS1 at the end of the stroke.

The cycle of operation will be successively repeated until pendant switch PS1 is tripped by the operator. This will deenergize relay coil ARa which will immediately deenergize the pattern windings of the magnetic amplifier by opening contacts AR4 and AR7 as relay AR drops out; closure of contact AR1 will energize relay coil DFa opening contact DF1 and closing contact DF3. It is to be noted that any of coils CRa, CRb and CRc can actuate relay CR. Since CRa is across the armature of generator G, relay CR remains picked up as the voltage comes down to some low value. When the voltage has dropped far enough, relay CR drops out, causing relay DF to pick up and connect the differential field winding 15 across the armature. This prevents excessive current through field winding 15 that would result if the field winding were connected across the armature 12 before the generated voltage is reduced to a low value. Opening of contact DF1 will actuate relay M so as to open contact M1 thereby removing excitation from generator G further hastening the decay of the voltage generated thereby. The motor M will quickly come to rest and will not creep, inasmuch as there will be no voltage output from the generator G due to the action of the differential field 15.

Assuming again that the machine has been stopped with neither of limit switches LS₁ and LS₂ tripped to initially accelerate the machine tool on a return stroke, it is only necessary to depress push button PB₁. This will complete a circuit from bus 101 through PS₁, LS₂, contacts 89, AR₇ and CD₃ to terminal 144, thereby applying the voltages between buses 101 and 103 across serially connected resistors 113 and 111 and the lower half of resistor 109. The pattern windings will be energized to produce an output from magnetic amplifier channel 44 thereby driving motor M in the return stroke direction as described above. The cyclic operation described with reference to the initiation of automatic operation by pressing push button PB₂ will thereupon ensue.

If the motor was previously stopped with limit switch LS₁ tripped, it is necessary to initially depress push button PB₂, after which the cycle of operation previously described will ensue switch LS₁ immediately being closed; likewise, with limit switch LS₂ tripped, it is neccesary to depress push button PB₁ to start the machine.

When it is desired to jog the machine tool manually, push buttons PB₃ and PB₄ are alternately pressed for inch-cut operation and inch-return operation, respectively. Closure of contacts 95 of push button PB₃ energizes relay coil CR₃ through contacts RD₃, 95, AR₉ and pendant switch PS₁. The relay CR will pick up, removing the differential field 15 from across armature 12 of generator G, and relay M will pick up to close the generator field circuit. Inasmuch as CD₂ is closed and CD₁ is open, the voltage between the center tap of resistor 10 and the juncture of resistors 105 and 107 will provide a minimum excitation current for the pattern field in the cut direction of flow. The output voltages of magnetic amplifier channel 44, exciter E and generator G will build up and motor M will rotate in the cut direction of rotation.

Similarly, closing push button PB₄ will actuate relay CR by energizing coil CR₆ through contacts CD₃, 99, AR₉ and pendant switch PS₁ thereby connecting bus 101 to terminal 114 and energizing the pattern windings with the voltage across resistor 111 and the lower half of resistor 109 since contact RD₂ is closed. Energization of the pattern field will produce output voltage from magnetic amplifier channel 44, exciter E and generator G, and motor M will rotate in the return direction of rotation.

The motor speed in the cut direction is controlled by varying the tap on potentiometer 105, increasing speed being obtained as the tap is moved in the direction of terminal 106. Likewise, motor speed in the return direction is controlled by varying the tap 113a on potentiometer 113, increasing speed being obtained by moving the tap toward terminal 114. At a predetermined point on potentiometer 105 or 113, the magnetic amplifier channel 57 or 44, respectively will be furnishing maximum current. At this point, relay IR (the actuating coil IR₆ of which is in series with the pattern windings of the magnetic amplifier) will pick up by virtue of the current then flowing through relay coil IR₆, and contactor IR₁ will close. The output voltage of generator G will energize coil FR₆ of relay FR through contact IR₁, thereby picking up relay FR and opening contact FR₁. Relay coil FW₆ will be deenergized thereby, and short circuits imposed upon resistors 79 and 83 by contacts FW and FW₁, respectively, of relay FW will be removed. The current flowing through field 25 of motor M will be reduced in accordance with the resistance of resistor 83 and the motor speed will accordingly tend to increase. This tendency will be counterbalanced by the reduced main generator output voltage applied to the motor armature resulting from the insertion of resistance 79 in the pattern field circuit of the magnetic amplifier. The motor speed will therefore be only slightly higher than the speed obtained immediately before relay IR was actuated, but the speed can thereafter be increased by moving the tap of potentiometer 105 towards terminal 106, inasmuch as the main generator, exciter, and magnetic amplifier 57 are no longer at maximum voltage. This arrangement makes it possible to utilize a smaller main generator and exciter and magnetic amplifier than would otherwise be possible if the main generator had to furnish armature voltage range for the entire speed range of motor M.

When the cutting tool approaches hard spots in the workpiece, it is desirable to quickly decrease the cutting speed of the tool. This may be effected by depressing push button PB₅ to energize relay coil SD₆ thereby actuating relay SD to close contacts SD₁ and SD₃ which respectively apply full field to motor M and reduce the pattern current in the cut direction, and open contact SD₂ which disconnects tap 105a from the pattern winding circut. The resulting decrease in the output voltage and current from the magnetic amplifier will accordingly reduce the output voltages of exciter E and generator G and slow the motor M to a predetermined value.

It is to be noted that coil FR₆ and either of coils FR₆ and FR₆ must be energized before relay FR can pick up. This prevents weak field from being applied to the motor until relay IR picks up and until the generator voltage has attained suitable magnitude, since neither coil FR₆ nor FR₆ alone is capable of actuating relay FR. Upon reversal, relay FR drops out immediately, since coils FR₆ and FR₆ are switched; thereby restoring full motor field current for the reversal operation.

In accordance with the teachings of our invention, there has been produced a motor control system for a reciprocating machine tool wherein the period between actuation of limit switches on the machine tool and the start of a reversing cycle in the control system is reduced to a minimum. Additionally, our invention provides a control system for a generator energizing a direct-current drive motor that limits the voltages induced in the generator windings during a reversing operation by limiting the rate of change of current in the field winding of the generator. In this manner, flashover at the commutator of the generator or motor is prevented without requiring the use of current limiting devices that could impede operation of the system under certain circumstances. Additionally, our invention provides a control system that can be operated from small, conveniently-mounted speed rheostats, push buttons, and like control devices.

The invention is not to be restricted to the specific structural details, arrangement of parts or circuit connections herein set forth, as various modifications thereof may be effected without departing from the spirit and scope of this invention, and it is desired that only such limitations shall be imposed as are indicated in the appended claims.

We claim as our invention:

1. In a variable voltage motor-control system for a reciprocating machine tool including a drive motor and a main generator having armatures connected in a series loop; an exciter generator for said main generator; self-saturating magnetic amplifier means coupled to field winding means on said exciter generator adapted to vary the magnitude and polarity of the output voltage of said exciter generator in accordance with the magnitude and direction of flow of a control current throughout first control winding means on said magnetic amplifier means; second control winding means on said magnetic amplifier means adapted to vary the polarity and magnitude output voltage of said magnetic amplifier means in accordance with the magnitude and direction of current flow therethrough; means coupled to the armatures of said main generator and said exciter generator adapted to derive voltages therefrom proportional to the voltages appearing across said armatures, said proportional voltages being coupled to opposite terminals of said second control winding means so that the voltage output of said magnetic amplifier will decrease in amplitude will increase in the voltage difference across said second control winding means.

2. In a variable voltage motor-control system for a reciprocating machine tool including a drive motor and a main generator having armatures connected in a series loop; an exciter-generator connected to field windings of said main generator, excitation means for said exciter generator adapted to vary the amplitude and polarity of the output voltage of said exciter-generator in accordance with the amplitude and polarity of a control signal coupled thereto, first means deriving first and second voltages proportional to the output voltages generated by said main generator and by said exciter generator, said first and second voltages being substantially equal in magnitude under steady state conditions in said control system; and second means controlling the output of said excitation means and coupled to said first means adapted to limit the rate of change of voltage output of said exciter generator when said first and second voltages differ by more than a given magnitude.

3. In a variable voltage motor control system for a reciprocating machine tool including a drive motor and a main generator having armatures connected in a series loop; an exciter generator connected to the field circuit of said main generator, magnetic amplifier means connected to the field circuit of said exciter generator and adapted to supply excitation current thereto in accordance with the magnitude and direction of flow of control current through first control winding means thereon, second control winding means on said magnetic amplifier connected in a series loop with a separate field winding on said exciter generators; first and second means respectively connected to the armature circuits of said main generator and said exciter generator adapted to derive first and second voltages proportional to the generated voltages thereacross; third means coupling said first and second means to opposite terminals of said second control winding adapted to force current therethrough proportional to the potential difference between said first and second voltages after said potential difference exceeds a given value, said current being of a direction of flow so as to oppose the effect of current flow through said first control winding responsive for said potential difference.

4. In a variable voltage motor control system for a reciprocating machine tool including a machine tool drive motor and a main generator having armatures connected in a series loop, field excitation means for said main generator adapted to vary the magnitude and polarity of the main generator output in accordance with the magnitude and direction of flow of a control current coupled to a control winding on said excitation means; control current generating means including a constant potential direct-current source, centertapped resistance means having a variable tap on each side of centertap, said centertap being connected to one terminal of said direct-current source, switch means adapted to alternately connect the terminals of said resistance means to the other terminal of said direct-current source at predetermined positions of said machine tool, means responsive to said switch means adapted to alternately connect said control winding to said variable taps and to said centertap so as to reverse direction of current flow therethrough.

5. In a variable voltage control system for a reciprocating machine tool including a drive motor and a main generator having armatures serially connected in a closed loop, field excitation means for said main generator adapted to vary the magnitude and polarity of the main generator output in accordance with the magnitude and direction of flow of a control current energizing a control coil of said excitation means; control current control means including a source of direct current, first potentiometer means, centertapped resistance means and second potentiometer means serially connected in that order with one of the terminals of said direct-current source connected to the center tap of said centertapped resistance means, switch means adapted to connect the other free terminals of said first and second potentiometer means in alternation to the other terminal of said direct-current source at predetermined positions of said machine tool, and means responsive to said switch means adapted to connect the taps of said first potentiometer means to one terminal of said control coil and the tap of said second potentiometer to the other terminal of said control coil, in alternation.

6. In a variable voltage control system for a reciprocating machine tool including a drive motor and a main generator having armatures serially connected in a closed loop, field excitation means for said main generator adapted to vary the magnitude and polarity of the main generator output in accordance with the magnitude and direction of flow of a control current energizing a control coil of said excitation means; control current control means including a source of direct current, first potentiometer means, centertapped resistance means and second potentiometer means serially connected in that order with one of the terminals of said direct-current source connected to the center tap of said centertapped resistance means, switch means adapted to connect the other free terminals of said first and second potentiometer means in alternation to the other terminal of said direct-current source at predetermined positions of said machine tool, means responsive to said switch means adapted to connect the taps of said first potentiometer means to one terminal of said control coil and the tap of said second potentiometer to the other terminal of said control coil, in alternation, and relay means responsive to a given magnitude of control current adapted to simultaneously reduce said control current to a second given magnitude and reduce the field current of drive motor, so as to maintain a given motor speed at a given setting of said potentiometer taps.

7. In a variable voltage control system for a reciprocating machine tool including a drive motor and a main generator having armatures serially connected in a closed loop, field excitation means for said main generator adapted to vary the magnitude and polarity of the main generator output in accordance with the magnitude and direction of flow of a control current energizing a control coil of said excitation means; control current control means including a source of direct current, first potentiometer means, centertapped resistance means and second potentiometer means serially connected in that order with one of the terminals of said direct-current source connected to the center tap of said centertapped resistance means, switch means adapted to connect the other free terminals of said first and second potentiometer means in alternation to the other terminal of said direct-current source at predetermined positions of said machine tool, and means responsive to said switch means adapted to connect the taps of said first potentiometer means to one terminal of said control coil and the tap of said second potentiometer to the other terminal of said control coil, in alternation, relay means responsive to a given magnitude of control current adapted to simultaneously reduce said control current to a second given magnitude and reduce the field current of drive motor, so as to maintain a given motor speed at a given setting of said potentiometer taps, and manually actuated relay means adapted to connect said control coil across the outer terminals of said centertapped resistance.

8. In a regulating system for a generator having a field winding, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network comprising a resistor and an inductance member connected in series circuit relationship, the current delay network being connected in circuit relationship with said another control winding and with said damping windings, said damping winding being so magnetically disposed with respect to the control winding of the rotating magnetic amplifier that with a sudden change in the magnitude of the current flow through the control winding disposed in inductive relationship with the magnetic core means and responsive to the output of the generator a voltage is induced in the damping winding proportional to the derivative of the output voltage of the rotating magnetic amplifier which induced voltage effects a current flow through said another control winding which produces a flux in the magnetic core means that opposes the change in flux produced by the sudden changes in the magnitude of the current flow through the control winding disposed in inductive relationship with the magnetic core means, means for deriving a first and a second voltage proportional to the output voltages of said generator and said rotating magnetic amplifier, respectively, and means for differentially applying said voltages to said another control winding to effect a current flow therethrough that opposes the change in flux produced by the sudden change in the magnitude of the current flow through said control winding disposed in inductive relationship with the magnetic core means.

9. In a regulating system for a generator having a field winding, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network comprising a resistor and an inductance member connected in series circuit relationship, the current delay network being connected in circuit relationship with said another control winding and with said damping windings, said damping winding being so magnetically disposed with respect to the control winding of the rotating magnetic amplifier that with a sudden change in the magnitude of the current flow through the control winding disposed in inductive relationship with the magnetic core means and responsive to the output of the generator a voltage is induced in the damping winding proportional to the derivative of the output voltage of the rotating magnetic amplifier, which induced voltage effects a current flow through said another control winding which produces a flux in the magnetic core means that opposes the change in flux produced by the sudden changes in the magnitude of the current flow through the control winding disposed in inductive relationship with the magnetic core means, first and second potentiometer means connected across the outputs of said generator and said rotating magnetic amplifier respectively, the taps on which are adjusted to provide substantially equal voltages under steady-state operating conditions; means connecting said taps to opposite ends of said another control winding means adapted to effect a current flow therethrough when the potential difference at said taps exceeds a given value that opposes the change in flux produced by the sudden change in the magnitude of the current flow through said control winding disposed in inductive relationship with the magnetic core means.

10. In a regulating system for a generator having a field winding, the combination comprising a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network comprising a resistor and an inductance member connected in series circuit relationship, the current delay network being connected in circuit relationship with said another control winding and with said damping windings, said damping winding being so magnetically disposed with respect to the control winding of the rotating magnetic amplifier that with a sudden change in the magnitude of the current flow through the control winding disposed in inductive relationship with the magnetic core means and responsive to the output of the generator a voltage is induced in the damping winding proportional to the derivative of the output voltage of the rotating magnetic amplifier, which induced voltage effects a current flow through said another control winding which produces a flux in the magnetic core means that opposes the change in flux produced by the suddent changes in the magnitude of the current flow through the control winding disposed in inductive relationship with the magnetic core means, first and second means for deriving first and second voltages proportional to the output voltages of said generator and said rotating magnetic amplifier respectively, means coupling said first and second means to said another control winding means adapted to effect a current flow therethrough after the potential difference between said first and second voltages exceeds a given value adapted to effect a current flow therethrough when said potential difference between said first and second voltages exceeds a given value that opposes the change in flux produced by the sudden change in the magnitude of the current flow through said control winding disposed in inductive relationship with the magnetic core means.

11. In a regulating system for a generator having a field winding, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, means for deriving first and second voltages proportional to the output voltages of said generator and said rotating magnetic amplifier respectively, and means for differentially applying said voltages to said another control winding to effect a current flow therethrough that opposes the change in flux produced by the sudden change in the magnitude of the current flow through said control winding disposed in inductive relationship with the magnetic core means.

12. In a regulating system for a generator having a field winding, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, first and second potentiometer means connected across the outputs of said generator and said rotating magnetic amplifier, respectively, the taps on which are adjusted to provide substantially equal voltages under steady-state operating conditions; means connecting said taps to opposite ends of said another control winding means adapted to effect a current flow therethrough when the potential difference at said taps exceeds a given value that opposes the change in flux produced by the sudden change in the magnitude of the current flow through said control winding disposed in inductive relationship with the magnetic core means.

13. In a regulating system for a generator having a field winding, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, said rotating magnetic amplifier having a damping winding and a control winding disposed in inductive relationship with one another, circuit means for rendering said control winding of the rotating magnetic amplifier responsive to the magnitude of the current flow through said load winding when said load winding is connected to a suitable source of alternating current, another control winding disposed in inductive relationship with said magnetic core means of said saturable reactor, first and second means for deriving first and second voltages proportional to the output voltages of said generator and said rotating magnetic amplifier respectively, means coupling said first and second means to said another control winding means adapted to effect a current flow therethrough after the potential difference between said first and second voltages exceeds a given value adapted to effect a current flow therethrough, when said potential difference between said first and second voltages exceeds a given value that opposes the change in flux produced by the sudden change in the magnitude of the current flow through said control winding disposed in inductive relationship with said magnetic core means.

References Cited in the file of this patent

UNITED STATES PATENTS

| | | |
|---|---|---|
| 2,632,145 | Sikorra | Mar. 17, 1953 |
| 2,677,085 | Sikorra | Apr. 27, 1954 |